Figure 1:
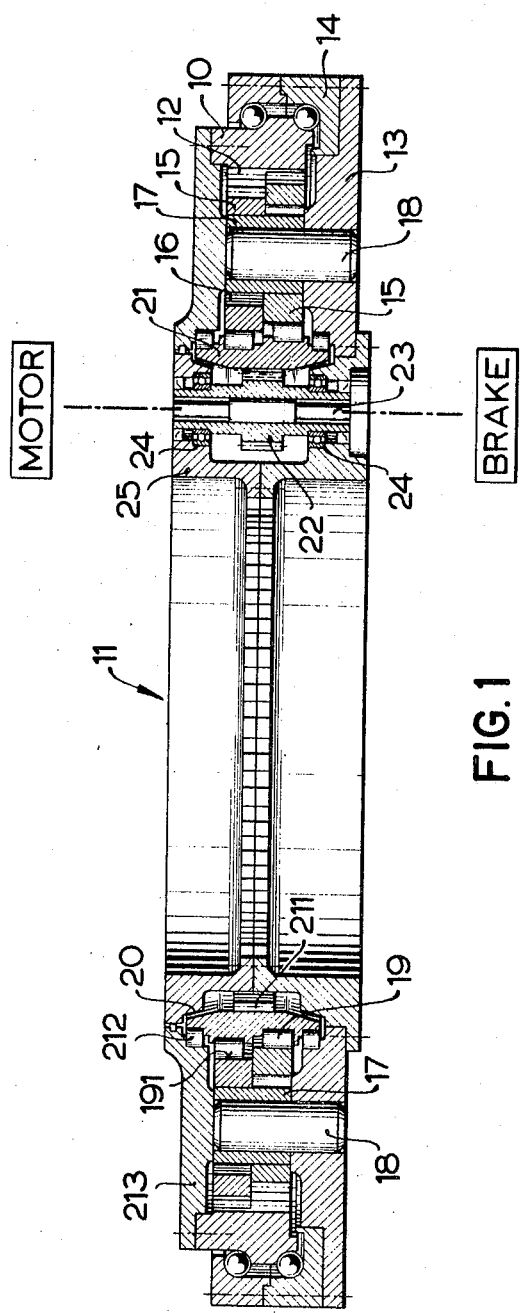

United States Patent [19]

Fleischer et al.

[11] 3,861,243

[45] Jan. 21, 1975

[54] ROTARY CONNECTION FOR ROLL BODIES WITH TRANSMISSION

[75] Inventors: Hans Fleischer, Herdecke, Germany

[73] Assignee: Hoesche Werke Aktingesellschaft, Dortmund, Germany

[22] Filed: Apr. 30, 1973

[21] Appl. No.: 355,863

[30] Foreign Application Priority Data
Apr. 29, 1972   Germany............................ 2221211

[52] U.S. Cl.............................. 74/805, 212/69
[51] Int. Cl....................... F16h 1/28, B66c 23/84
[58] Field of Search ................ 74/805, 804; 212/69

[56] References Cited
UNITED STATES PATENTS

| | | | |
|---|---|---|---|
| 1,870,875 | 8/1932 | Scheuer | 74/805 |
| 3,451,290 | 6/1969 | Wildhaber | 74/805 |
| 3,452,624 | 7/1969 | Lorence | 774/805 |
| 3,662,623 | 5/1972 | Lorence | 74/805 |
| 3,738,194 | 6/1973 | Lorence | 74/805 |

FOREIGN PATENTS OR APPLICATIONS

| | | | |
|---|---|---|---|
| 626,596 | 5/1927 | France | 418/122 |
| 993,574 | 5/1965 | Great Britain | 418/122 |
| 1,154,315 | 9/1963 | Germany | 418/142 |

*Primary Examiner*—Samuel Scott
*Assistant Examiner*—D. S. Lall
*Attorney, Agent, or Firm*—Walter Becker

[57] ABSTRACT

An antifriction bearing with built-in transmission, especially as connection unit between a stationary and a rotatable member, which has an outer race ring adapted to be held stationary and an inner rotatable race ring with inner teeth, while within the confines of the inner race ring there is arranged a transmission system comprising a spur gear drive and eccentric planetary gears drivingly connected to the inner teeth of the inner race ring for rotating the same. The spur gear drive is adapted to be connected to a prime mover, and has a brake associated therewith.

6 Claims, 2 Drawing Figures

ROTARY CONNECTION FOR ROLL BODIES WITH TRANSMISSION

The present invention concerns a rotary connection for roll bodies with a transmission as connecting element in devices having a rotatable upper part and a non-rotatable lower part, the rotary connection comprising a giant antifriction bearing with stationary outer race ring and with rotatable inner race ring and a multistage transmission.

With rotary connections of this type it is necessary with small outer dimensions to maintain a high transmission ratio at low tooth load.

A driving device for a turntable of a dredge has become known in which the motor drives an eccentric mounted about an intermediate sleeve in the driving device. The eccentric drives a one-piece transmission system comprising two gears, namely a large outer gear and a small inner gear. The outer gear meshes with the inner teeth of the fixedly arranged outer toothed ring of the lower part which is connected, for instance, to the understructure or carriage of the dredge. When the eccentric turns, the large outer gear moves in opposite direction while the inner gear turns together with the outer gear and meshes with a second freely movable inner gear ring which moves in opposite direction. The last mentioned inner gear ring forms a fixed part of the turntable. Due to a slight difference in the number of teeth, always a plurality of teeth are in mesh. Such an arrangement comprises a great number of parts, is expensive, is heavy and as to its height is considerably larger than customary giant bearings because the teeth have to be made rather strong. The inner forces of the transmission are very high because no power division occurs in the transmission. The ball rotary connection is, due to the last mentioned inner gear ring, subjected to considerable additional forces which reduce the life span of the system. The greater the diameter of the giant bearing, the more unfavorable will these conditions become. Furthermore, the power transmission by the teeth is effected unilaterally. Transmissions of this construction have the tendency that at high step-down transmission ratios for instance $i = 80$, their degree of efficiency will decrease considerably, even to the point where automatic locking occurs.

Eccentric planetary gear transmissions with an output in the form of a bolt (Bolzenabtrieb) have become known, for instance, by German Pat. No. 1,087,865.

It is, therefore, an object of the present invention to provide a rotary connection for roll bodies with a transmission of the above referred to general character in which in the available space there is installed a transmission which aids the power to be transmitted while the central portion of the rotary connection using balls remains free and while the above mentioned drawbacks will be avoided.

This object and other objects and advantages of the invention will appear more clearly from the following specification in connection with the accompanying drawing illustrating a cross section through a rotary connection according to the present invention.

The rotary connection according to the present invention is characterized primarily in that the transmission comprises a spur gear drive and an eccentric planetary gear transmission with an output in the form of a bolt. In this connection it is expedient that the pinion meshes with the inner teeth of an inner hollow gear having two eccentric running surfaces on which through the intervention of roller bearings there are mounted two planetary gears with outer teeth. These planetary gears mesh with the inner teeth of an outer hollow gear of the inner ring. It is furthermore expedient that supporting bolts provided with sleeves extend through a plurality of circular openings provided in the planetary gears, these supporting bolts being arranged in the stationary housing part.

For driving the rotary connection according to the invention, one or more pinions are arranged on the inner teeth of an inner hollow gear.

For purposes of absorbing the tooth forces, it has proved advantageous to select the engaging angle of the involute tooth system between the inner teeth of the inner hollow gear and the pinion and the hollow gear of the inner ring and the planetary gears so that it amounts to from 30 to 45°, preferably to 37°.

Figure 2:
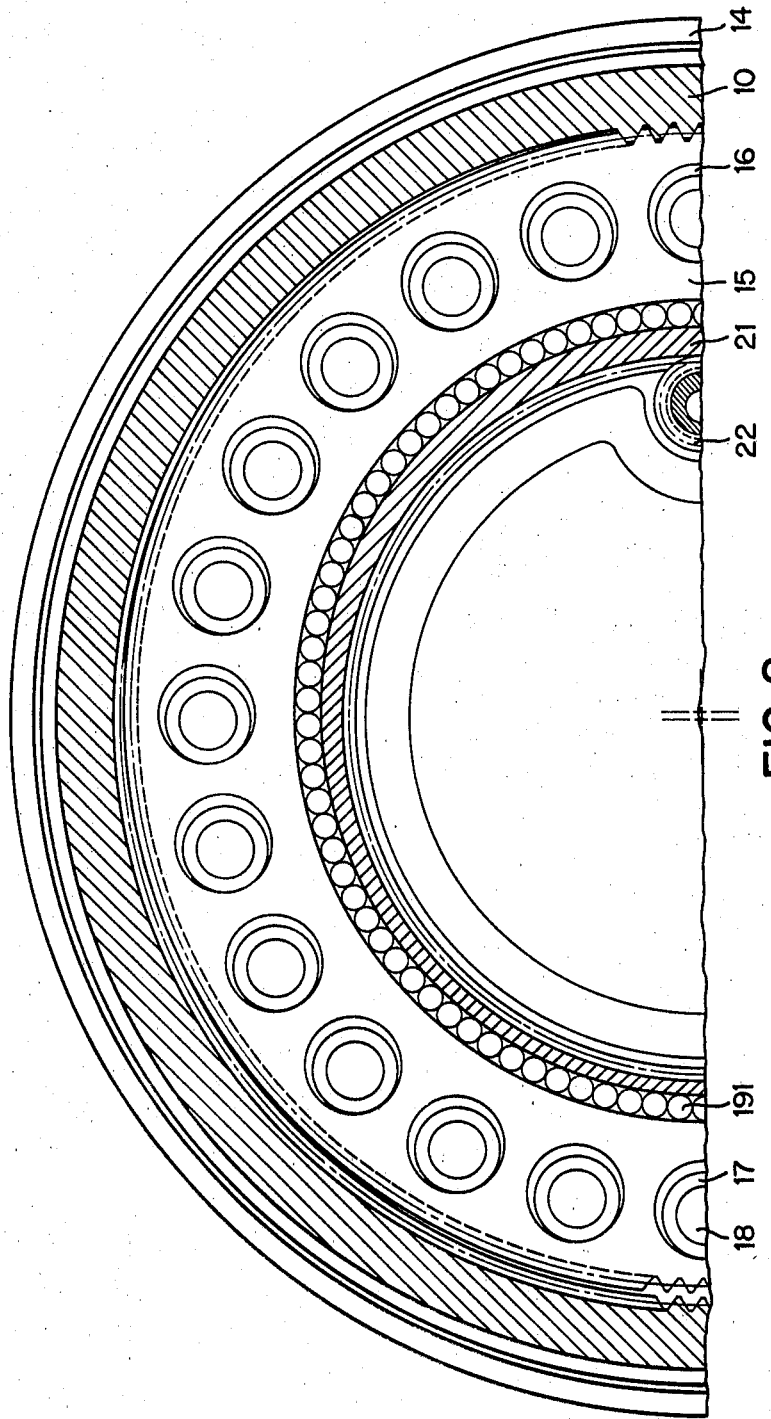

Referring now to the drawings in detail wherein FIG. 1 is a transverse sectional view and FIG. 2 is a fragmentary sectional view in elevation, the arrangement according to the present invention comprises a two-row three-sectional rotary connection 11 for antifriction bodies with an inner race ring 10 having arranged thereon an outer hollow gear 12. The connection 11 furthermore comprises a stationary housing part 13 which is detachably connected to a two-sectional outer ring 14 of the connection 11. Planetary gears 15 with outer teeth mesh with the outer hollow gear 12, the planetary gears 15 being oppositely eccentrically arranged. The planetary gears 15 are movably connected to the housing part 13 through the intervention of supporting bolts 18 which extend through circular openings 16, the supporting bolts 18 being guided on loose sleeves 17. The planetary gears 15 simultaneously form the outer rings of two roller bearings 19 which are eccentrically arranged and are provided with running surfaces 191 located in two parallel planes. Inner teeth 211 are arranged on the central inner portion 20 of the common inner hollow gear 21. The inner gear 21 is through the intervention of two antifriction bearings 212 guided on the lower side in the stationary housing part 13 and on the upper side in a housing cover 213 which is detachably connected to the rotatable race ring 10 and to which may be connected e.g. a turntable. The pinion 22 which meshes with the gear 21 is through a pinion shaft 23 on both sides respectively journalled in ball bearings 24 located in a two-sectional pinion housing 25 which latter is detachably connected to the stationary housing part 13. The number of teeth of the outer hollow gear 12 is higher or greater by at least one more than the number of teeth of the planetary gears 15. Each revolution of the eccentric roller bearing 19 results in movement of the respective planetary gear 15 in the same direction by one or more teeth, depending on the difference in the number of teeth. Connected to the pinion shaft 23 on one side thereof is a non-illustrated motor whereas on the other side a non-illustrated brake is connected to shaft 23.

As rotary connection for roll bodies it is possible, aside from the two-row ball rotary connection illustrated in the drawing, also to employ other constructions, such as one-row or multi-row rotary connections for roll bodies, junction roller bearings (Kreuzrollenlager), wire antifriction bearings (Drahtwaelzlager), and the like.

By splitting up the output torque and respectively transferring it to two or more planetary gears 15, the inner forces of the transmission are kept low. Consequently, the width of the outer teeth can be kept rather narrow and the teeth may also be crowned with an involute tooth system of, for instance, 37°. This means that with heavy dredge operation, with which the rotary connection of the roll bodies is sometimes subjected to distortions, the circumferential forces can be absorbed by the teeth without jamming or overloading. In view of the output through stationary supporting bolts 18, stepdown ratios in one stage of $i = 125$ are possible without the degree of efficiency dropping materially below 0.9.

The advantages realized by the present invention consist primarily in that in spite of having high outputs, torques and transmission ratios, the central portion of the connection is kept free and the building height in axial direction is low. With dredges it is possible, for instance, to exchange a customary rotary connection for roll bodies for such connection according to the present invention without necessitating a structural change in the dredge.

It is, of course, to be understood that the present invention is, by no means, limited to the specific showing in the drawing but also comprises any modifications with the scope of the appended claims.

What I claim is:

1. An antifriction bearing with built-in transmission having mass equalization especially as connection unit between a stationary and rotatable member, which includes in combination: an outer race ring adapted to be held stationary and a rotatable inner race ring, and a transmission system arranged within the confines of said inner race ring and comprising a spur gear drive and eccentric planetary gear means drivingly connected to said rotatable inner race ring for rotating the same, said spur gear drive being connectable to a prime mover.

2. A bearing in combination according to claim 1, which includes housing means connected to said outer race ring, bolt means arranged partially within said housing means, and sleeve means surrounding said bolt means and supporting planetary gears of said planetary gear transmission.

3. A bearing in combination according to claim 2, which includes pinion means adapted to be connected to a prime mover, an inner hollow gear drivingly connected to said pinion means and having eccentric race ways, antifriction bearing means respectively arranged centrally free on said last mentioned race ways and supporting two planetary gear means with outer teeth, said planetary gear means meshing with inner teeth of said rotatable inner race ring.

4. A bearing in combination according to claim 3, in which said pinion means include at least one pinion meshing with the inner teeth of said inner hollow gear.

5. A bearing in combination according to claim 3, in which said rotatable inner race ring has inner teeth, and in which said inner hollow gear has inner teeth meshing with said pinion means, the engaging angle of the involute teeth between the inner teeth of said inner hollow gear and said pinion means and between the teeth of said rotatable inner race ring and said planetary gears is between 30 and 45°.

6. A bearing in combination according to claim 5, in which said engaging angle is approximately 37°.

* * * * *

UNITED STATES PATENT OFFICE
CERTIFICATE OF CORRECTION

Patent No. 3,861,243　　　　　　　　　Dated Jan. 21, 1975

Inventor(s) Hans Fleischer

It is certified that error appears in the above-identified patent and that said Letters Patent are hereby corrected as shown below:

On the Cover Sheet,

In item [73] "Hoesche" should read -- Hoesch -- and "Aktingesellschaft" should read -- Aktiengesellschaft --.

Signed and sealed this 1st day of April 1975.

(SEAL)
Attest:

RUTH C. MASON
Attesting Officer

C. MARSHALL DANN
Commissioner of Patents
and Trademarks